United States Patent [19]

Heinrich

[11] 3,739,084

[45] June 12, 1973

[54] FACSIMILE SYSTEM

[75] Inventor: Frank-Armin Heinrich, Korb, Germany

[73] Assignee: Robert Bosch Elektronik GmbH, Berlin, Germany

[22] Filed: Apr. 1, 1971

[21] Appl. No.: 130,378

[30] Foreign Application Priority Data

Apr. 11, 1970 Germany .................. P 20 17 432.7

[52] U.S. Cl. ............... 178/6, 178/DIG. 3, 346/74 R

[51] Int. Cl. .............................................. H04n 1/40

[58] Field of Search ............... 178/6, DIG. 3, 6.6 B, 178/5; 346/74 E

[56] References Cited

UNITED STATES PATENTS

| | | | |
|---|---|---|---|
| 3,474,192 | 10/1969 | Webb | 178/5 |
| 3,604,846 | 9/1971 | Behane | 178/5 |
| 3,294,896 | 12/1966 | Young, Jr. | 178/DIG. 3 |
| 1,790,722 | 2/1931 | Ranger | 178/DIG. 3 |
| 3,613,103 | 10/1971 | Harris | 346/74 E |

*Primary Examiner*—Howard W. Britton
*Attorney*—Spencer & Kaye

[57] ABSTRACT

An improved facsimile system wherein pictures having black, white and gray values of brightness are reproduced by means of a facsimile recorder which reproduces only black and white values of brightness. The scanning voltage signal produced by the line-by-line photoelectric scanning of the picture to be transmitted is converted, either at the transmitting location or at the receiving location, into signals representative of at least three different amplitude ranges. A low d.c. voltage signal is produced when the amplitude of the scanning voltage signal is in the lowest amplitude range which includes the amplitude value for "white," a high d.c. voltage signal is produced when the amplitude of the scanning voltage signal is in the highest amplitude range which includes the amplitude value for "black," and a periodic pulse sequence output signal is produced when the amplitude of the scanning voltage signal is in the intermediate range. Only the output signal corresponding to the highest determined amplitude of the scanning voltage signal is utilized to control the facsimile recorder, with the periodic pulse sequence signal causing the recorder to produce recordings having the effect of "gray" values of brightness. Preferably the intermediate amplitude range is subdivided into a plurality of amplitude ranges each of which is associated with a different periodic pulse sequence signal and with the sum of the pulse widths per unit time in each periodic pulse sequence being greater as the amplitude range associated therewith increases so that shades of gray may be reproduced.

6 Claims, 1 Drawing Figure

PATENTED JUN 12 1973 3.739,084
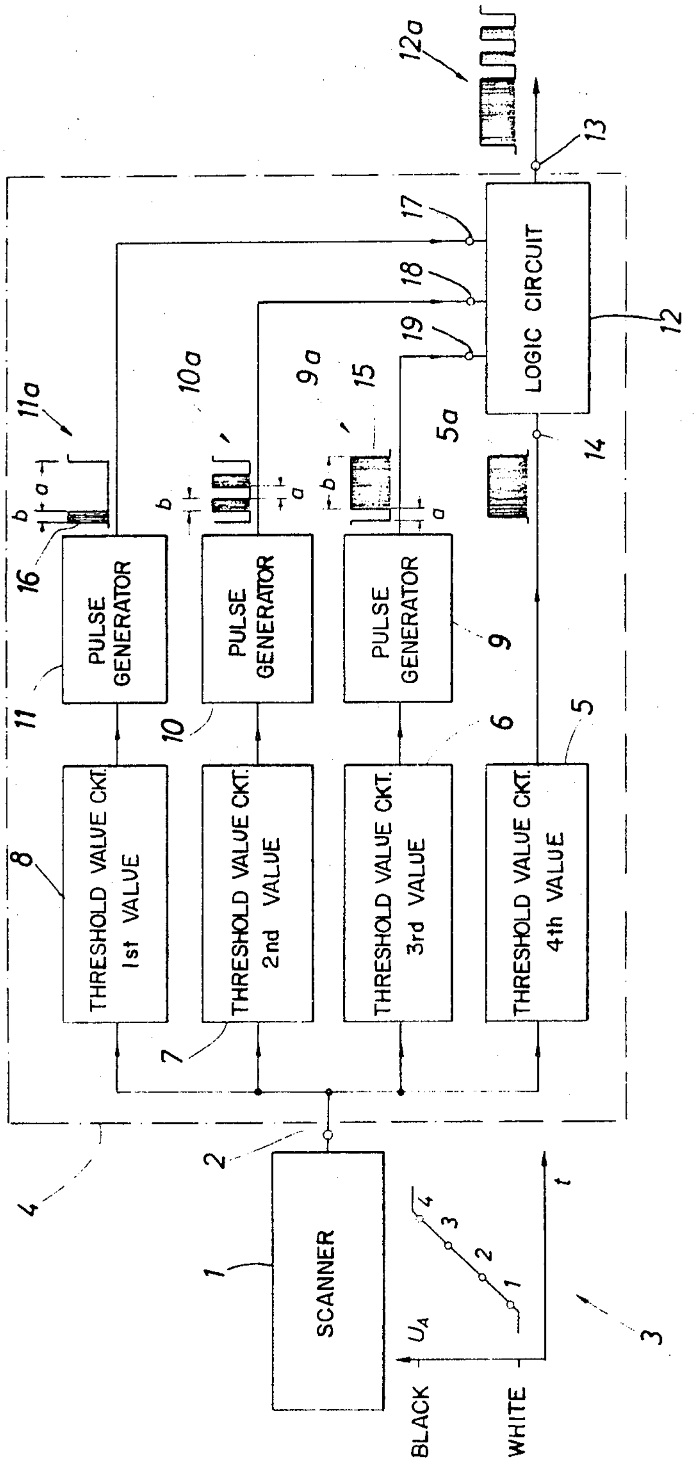
Inventor:
Frank-Armin Heinrich
BY Spencer & Kaye
ATTORNEYS.

FACSIMILE SYSTEM

BACKGROUND OF THE INVENTION

The present invention relates to an improved facsimile system. More particularly, the present invention relates to an improved method and apparatus for electrically transmitting pictures having black, white and gray brightness values by means of a scanning voltage which is produced at the transmitting station by photoelectric line-by-line scanning of the picture to be transmitted and which is proportional to the respective brightness values of the scanned lines, this scanning voltage controlling, at the receiving station, a recording device, e.g., a facsimile recorder, which reproduces only black values and white values to reproduce the picture.

The transmission of a picture by means of facsimile system comprising a picture transmitter and a picture receiver is well known in the art. In the picture transmitter of such systems, the picture to be transmitted is photoelectrically scanned and the picture voltage signal obtained from this scanning is transmitted to the picture receiver where a reproduction of the transmitted picture is recorded in synchronism with the scanning. In such systems, generally all the bright points of the picture to be transmitted are transmitted as "white" information and all the dark points of the picture are transmitted as "black" information since the devices usually utilized for reproducing the picture at the receiving station, e.g., a facsimile recorder, can reproduce only black values and white values.

Limiting the transmission to only black and white values of the scanned picture constitutes no drawback whatsoever if the picture to be transmitted also has only black and white details, such as for example drawings and documents. A decided drawback for such a pucture content transmission occurs, however when the picture to be transmitted also contains gray values in addition to the black and the white values, as is the case, for example, with a photograph or the like. In such a case, if the gray values are not transmitted, a substantial loss of information in the reproduced picture results.

Although facsimile writers which directly record gray values are known, these devices require a substantial quantity of technical expenditures so that their use is justified only in rare cases.

SUMMARY OF THE INVENTION

It is the object of the present invention to provide an improved picture transmitting process and apparatus whereby at least one gray value can be reproduced, in addition to a black value and a white value, utilizing a facsimile recorder which, according to its design, can only directly reproduce black values and white values.

This is accomplished according to the present invention in that in a method for electrically transmitting pictures having black, white and gray brightness values wherein a scanning voltage signal, which is produced at the transmitting station by the line-by-line photoelectric scanning of the picture to be transmitted and whose amplitude is proportional to the respective brightness values, is utilized, at the receiving station, to control a device for reproducing the pictures, e.g., a facsimile recorder, which only reproduces black values and white values, the scanning voltage signal is effectively divided into at least three amplitude ranges, either at the transmitting station or at the receiving station, and converted to a plurality of signals indicative of the respective amplitude ranges. In the range comprising the lower amplitudes which includes the amplitude value corresponding to the brightness value "white," the scanning voltage signal is converted into a low direct current voltage signal. Whenever the amplitude of the scanning voltage signal lies in the high amplitude range including the amplitude corresponding to the brightness value "black," a high direct current voltage signal is generated, and whenever the amplitude of the scanning voltage signal is in the intermediate range between the other two ranges, which range comprises the median amplitudes (gray values) of the scanning voltage, a periodic pulse sequence signal is generated. The facsimile recorder is then controlled in accordance with the one of the output signals associated with the highest amplitude range in which the amplitude of the scanning voltage signal is determined to lie, whereby the recorder will reproduce pictures having the effect of black, white and gray values of brightness.

Preferably the intermediate amplitude range is subdivided into a plurality of amplitude ranges each of which is associated with a different periodic pulse sequence signal, with the sum of the pulse widths per unit time in each respective pulse sequence signal being greater the higher the amplitude range with which the respective pulse sequence signal is associated. In this manner the recorder can produce pictures having the effect of shades of gray brightness values.

The apparatus for carrying out the method of the invention is realized by means of a scanning voltage conversion circuit which is connected in the signal path between the photoelectric scanner and the facsimile recorder and includes a first circuit, for example a threshold value circuit, for providing a low d.c. voltage signal whenever the amplitude scanning voltage signal is below a first predetermined value and a high d.c. voltage signal whenever the amplitude of the scanning voltage signal is above the first predetermined value; a second circuit, e.g., a threshold value circuit in series with a pulse generator, for providing a periodic pulse sequence output signal whenever the amplitude of the scanning voltage signal is above a second predetermined value which is less than the first predetermined value, and a circuit for transmitting only the output signal from the firSt and second circuits corresponding to the highest determined amplitude of the scanning voltage signal to the facsimile recorder.

Preferably a plurality of such second circuits are provided each of which is responsive to a different predetermined amplitude value and each of which provides a different periodic pulse sequence output signal with the sum of the pulse widths per unit time in each respective pulse sequence signal being greater as the predetermined amplitude associated therewith becomes greater.

BRIEF DESCRIPTION OF THE DRAWINGS

The FIGURE is a block circuit diagram illustrating a preferred embodiment of the invention.

DESCRIPTION OF THE PREFERRED EMBODIMENTS

Referring now to the drawing, there is shown a photoelectric scanner 1 of a facsimile transmitter. Scanner 1 scans a picture to be transmitted (not shown in the drawing), e.g., a black and white picture or a color picture, in the conventional line-by-line manner and produces a scanning voltage signal $U_A$ at the output 2 of the scanner 1. The amplitude of the scanning voltage signal $U_A$ is modulated by the respective brightness values of the scanned picture and exhibits for example a level which is somewhat above zero (white level) for a "white" brightness value of the picture to be transmitted, and a higher positive voltage value (black level) for a "black" value of brightness of the picture to be transmitted as indicated in the diagram 3 below scanner 1. Between the white and the black levels lie the voltage values associated with the different gray levels (gray values). The facsimile receiver to which the present invention is applicable is presumed to be equipped with a facsimile recorder which normally reproduces only black and white picture informations. The facsimile recorder therefore normally records all brightnesS values above a certain median gray value of the amplitude of the scanning voltage as "black" information whereas all brightness values lying below this defined median amplitude value do not produce blackening of the recording carrier and hence leave it white.

In order for the facsimile recorder which can only reproduce black and white brightness values, to be able to also reproduce a picture with gray values, according to the invention the following measures are taken: During the line-by-line scanning of a picture to be transmitted which contains black, white and gray picture details, scanner 1 furnishes a scanning voltage $U_A$ which has an amplitude proportional to the momentary brightness value. The scanning value $U_A$ is fed to a signal converting circuit 4, shown in the drawing by dot-dashed lines, which is connected in the signal path between the output of scanner 1 and the input of the facsimile recorder. The circuit 4 substantially comprises four threshold value switches 5 to 8 whose inputs are connected in parallel, three pulse generators 9 through 11 connected to the threshold value switches 6 to 8 respectively, and a logic circuit 12 whose inputs are connected to the outputs of the threshold value switch 5 and the pulse generator 9–11 and whose output 13 simultaneously forms the output of the signal converting circuit 4. The threshold value switches 5–8 are preferably electronic threshold value switches, e.g., Schmitt triggers.

The threshold value switches 5–8 and pulse generators 9–11 operate in the following manner to convert the scanning voltage signal to signals which cause the recorder to reproduce pictures with the effect of black, white and gray: The threshold value switch 5 serves the purpose of furnishing a, e.g., positive, direct voltage 5*a* to a first input 14 of logic circuit 12 whenever and as long as the amplitude of scanning voltage signal $U_A$ reaches or exceeds a predetermined fourth threshold value indicated by the point 4 in diagram 3. The amplitude range lying between point 4 and the maximum amplitude (black value) of the scanning voltage signal $U_A$ characterizes the brightness value "black," i.e., all amplitudes of this range influence threshold value circuit 5 in such a manner that it furnishes the, e.g., positive, direct voltage which causes a facsimile recorder to draw a black line on a white recording carrier, for example.

The predetermined threshold value voltage of threshold value switch 6 coincides with the third threshold value of the scanning voltage which is associated with point 3 of diagram 3. All amplitudes of scanning voltage signal $U_A$ which reach or exceed this third threshold value voltage cause the threshold value switch 6 to switch its state of operation and thus turn on pulse generator 9 which furnishes a periodic pulse sequence or pulse train 9*a* having a high keying ratio in which thus the width *b* of a pulse 15 is substantially greater, e.g., four times the width a of the interval between pulses. The amplitude of the pulses should be sufficiently great so that the recorder will respond thereto, e.g., at least equal to the maximum amplitude of the d.c. voltage. When the pulse train 9*a* controls a facsimile recorder, a black line interrupted by short pauses will be recorded which, at a certain distance from the recording carrier, will be integrated by the eye of the observer as a dark gray area. The amplitude range between threshold values 3 and 4 according to diagram 3 thus has the associated picture value of "dark gray" during the recording of the picture.

Threshold value circuit 7 has a threshold value voltage which corresponds to the second threshold value corresponding to point 2 in diagram 3. All amplitudes of scanning voltage $U_A$ which reach or exceed point 2 in diagram 3 switch threshold value switch 7 which causes its output to turn on pulse generator 10. Pulse generator 10 furnishes a periodic pulse sequence or pulse train signal 10*a* whose period duration $(a + b)$ is half as long as that of pulse train 9*a* and which has pulses *b* and pulse intervals *a* of the same duration $(a = b)$. In the facsimile recorder which is controlled by this pulse train, the linear black recording is interrupted at equal intervals so that the eye of the observer perceives a medium gray. All amplitudes in the range between the limit or threshold values 2 and 3 according to diagram 3 are thus reproduced as "medium gray" brightness values.

The threshold value voltage of threshold value switch 8 corresponds to a first threshold value belonging to point 1 in diagram 3. Therefore all amplitudes of scanning voltage signal $U_A$ which reach or exceed the threshold voltage of the threshold value switch 8 switch the threshold value switch causing its output to switch on the pulse generator 11. Pulse generator 11 furnishes a periodic pulse sequence pulse train signal 11*a* having relatively small pulse width *b* and larger pulse intervals *a*. Since the facsimile recorder records a black line only during the duration of pulse widths *b* and no recording takes place during the pulse intervals, this pulse train results in providing the effect of a light gray recording when the recording is observed. The amplitude range between the first and second threshold values thus is associated with the brightness value "light gray."

As is evident from the above discussion and the illustration of the individual pulse trains 9*a*, 10*a*, and 11*a*, in order to produce the effect of various shades of gray in the picture reproduced by the facsimile recorder, the sum of the pulse widths per unit time in each pulse train is greater or increases as the amplitude range with which it is associated becomes greater. The various pulse trains associated with the different amplitude ranges, i.e., 9*a*, 10*a*, 11*a*, may all have the same pulse repetition frequency but different keying ratios or may have different keying ratios but constant pulse intervals or constant pulse widths so that different pulse repetition frequencies result. The pulse generator 9, 11 may be any conventional pulse generator, e.g., a free running multivibrator, which is controlled by the output signal from the respective threshold circuit 5 – 8 so that it is turned on, i.e., produces output pulses, in response to an output signal from the associated threshold device indicating that the associated threshold value has been exceeded. The output signal from the associated threshold device turns on the multi-vibrator in any conventional manner, e.g., by closing a switch in the power circuit or by opening a gate connected to the output. Free running multivibrators and the manner of varying the keying ratio or frequency thereof are disclosed, for example in F.Terman, Electronic and Radio Engineering, 4th Edition, pp. 625–630, McGraw-Hill, New York (1955).

As long as the amplitude of scanning voltage signal $U_A$ lies below the first threshold value (point 1 in diagram 3) none of the threshold value switches 5 to 8 responds and pulse generators 9 through 11 do not furnish any pulse train signals. In such case, the threshold value switch 5 produces a direct current voltage output signal which deviates from the direct voltage 5*a*, for example, a lower direct voltage of zero volt, and to which the facsimile recorder does not respond, which output signal corresponds to the recording of the brightness value "white."

The outputs of the pulse generators 9 through 11 are each connected to a respective input 17, 18, 19 of logic circuit 12. It is the purpose of the logic circuit 12 to transmit only that output voltage signal of pulse generators 9 through 11 and threshold value switch 5 to the output 13 which corresponds to the amplitude range having the highest threshold value, i.e., in the present example, the highest degree of blackening. If the amplitude of the scanning voltage signal $U_A$, for example, reaches the fourth threshold value (point 4 in diagram 3), all threshold value switches 5 to 8 will respond. However, at the output 13 of logic circuit 12 only voltage 5*a* must appear, not the pulse trains 9*a*, 10*a* and 11*a* which were produced at the same time. A circuit suitable for the logic circuit 12 is disclosed, for example, in U.S. Pat. No. 3,403,341, issued Sept. 24th, 1968 to E. Munch.

The output signal 12*a* of circuit 12 is then transmitted to the picture or facsimile receiver to control the facsimile recorder. The smallest pulse width *b*, see for example pulse 16 of pulse train 11*a*, is so selected that the maximum frequency required to transmit it from the facsimile transmitter to the facsimile receiver lies below the maximum transmittable frequency of the transmission channel therebetween, e.g., a telephone line or a radio channel.

Although in the illustrated embodiment, the amplitudes of the scanning voltage signal $U_A$ are divided into five amplitude ranges, which permits the reproduction, in addition to the "black" and "white" informations,of three different values of gray corresponding to threshold values 1 through 3 (diagram 3), it is to be understood that the invention is not limited to this number of amplitude ranges. In fact, it has been found in practice, that even the introduction of a single gray value between the brightness values "black" and "white" produces a substantially more natural impression of a picture reproduced by a facsimile recorder.

Furthermore, although in the illustrated embodiment the converting circuit 4 is located in the picture transmitter and the picture receiver contains a facsimile recorder which is no different from the commercially available facsimile recorders, it is to be understood that the converting circuit 4 may equally well be located in the picture receiver. In this case it is then possible to employ a commercially available picture transmitter whereas the picture receiver is supplemented by converting circuit 4 and the facsimile recorder is directly controlled by pulse train 12*a*.

It will be understood that the above description of the present invention is susceptible to various modifications, changes and adaptations, and the same are intended to be comprehended within the meaning and range of equivalents of the appended claims.

I claim:

1. In a facsimile system for electrically transmitting pictures between a transmitting station and a receiving station for reproduction at said receiving station, wherein the picture to be transmitted and reproduced is photoelectrically scanned, line-by-line, to produce a scanning voltage signal whose amplitude is proportional to the respective brightness values of the scanned line of the picture, and the scanning voltage signal is transmitted to the receiving station where it is utilized to control a facsimile recorder which only records black or white brightness values, the improvement wherein a scanning voltage signal converting circuit is connected in the single path to said facsimile recorder, said signal converting circuit comprising, in combination:

first circuit means responsive to the amplitude of said scanning voltage signal for producing a first direct voltage signal of an amplitude to which said recorder will not respond, whenever the amplitude of the scanning voltage is below a first predetermined value and for producing a second direct voltage signal, of a second higher amplitude to which said recorder does respond, whenever the amplitude of said scanning voltage exceeds said first predetermined value;

a plurality of second circuit means each of which is responsive to said scanning voltage signal for producing a periodic pulse sequence output signal, of an amplitude to which said recorder responds, whenever the amplitude of said scanning voltage signal exceeds a further predetermined value which is less than said first predetermined value, each of said second circuit means being responsive to a different predetermined value of the amplitude of said scanning voltage signal, and each of said second circuit means producing a different periodic pulse sequence output signal with the sum of the pulse widths per unit time in each periodic pulse sequence output signal being greater as the amplitude of said scanning voltage signal to which the respective one of said second circuit means responds becomes higher; and, third circuit means responsive to the output signals from said first and second circuit means for providing an output signal corresponding to only the input signal thereto representative of the highest determined amplitude range of said scanning voltage signal, whereby the output signal from said third circuit means controls said recorder to reproduce pictures having the effect of white, black and shades of gray picture content.

2. The apparatus defined in claim 1, wherein said signal converting circuit is at said transmitting station.

3. The apparatus defined in claim 1, wherein, said signal converting circuit is located at said receiving station.

4. The apparatus defined in claim 1, wherein said first and second circuit means are all connected in parallel between a common signal input and the input of said third circuit means.

5. The apparatus defined in claim 4, wherein said first circuit means is a threshold value circuit and wherein each of said second circuit means includes a threshold value circuit whose output is connected to and controls a pulse generator.

6. The apparatus as defined in claim 5, wherein said third circuit means comprises a logic switching circuit.

* * * * *